(12) United States Patent
Yanagihara

(10) Patent No.: US 7,312,643 B2
(45) Date of Patent: Dec. 25, 2007

(54) DIFFERENTIAL CURRENT DRIVER AND DATA TRANSMISSION METHOD

(75) Inventor: Junichi Yanagihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 18 days.

(21) Appl. No.: 10/788,468

(22) Filed: Mar. 1, 2004

(65) Prior Publication Data

US 2004/0189354 A1 Sep. 30, 2004

(30) Foreign Application Priority Data

Mar. 25, 2003 (JP) ............................. 2003-082334

(51) Int. Cl.
*H03K 3/00* (2006.01)

(52) U.S. Cl. .................... 327/108; 327/563

(58) Field of Classification Search ........ 327/108–112, 327/563
See application file for complete search history.

(56) References Cited

U.S. PATENT DOCUMENTS

| 5,644,258 | A | * | 7/1997 | Wu | 327/110 |
|---|---|---|---|---|---|
| 5,798,660 | A | * | 8/1998 | Cheng | 327/65 |
| RE36,013 | E | * | 12/1998 | Lee | 327/536 |
| 6,005,438 | A | * | 12/1999 | Shing | 330/253 |
| 6,091,531 | A | * | 7/2000 | Schwartz et al. | 398/208 |
| 6,118,340 | A | * | 9/2000 | Koen | 330/253 |
| 6,316,964 | B1 | * | 11/2001 | Watarai | 326/115 |
| 6,344,769 | B1 | * | 2/2002 | Giuroiu | 327/538 |
| 6,448,848 | B1 | * | 9/2002 | Altmann | 327/563 |
| 6,570,448 | B1 | * | 5/2003 | Sobel | 330/254 |
| 6,583,661 | B1 | * | 6/2003 | Tanji et al. | 327/355 |
| 6,617,888 | B2 | * | 9/2003 | Volk | 327/67 |
| 6,731,135 | B2 | * | 5/2004 | Brunolli | 326/83 |
| 6,744,308 | B1 | * | 6/2004 | Beumer | 327/563 |

FOREIGN PATENT DOCUMENTS

| JP | 05-252020 A | 9/1993 |
|---|---|---|
| JP | 08-204557 | 8/1996 |
| JP | 10-163846 | 6/1998 |
| JP | 2000-332610 | 11/2000 |

OTHER PUBLICATIONS

Japanese Office Action dated Aug. 9, 2005.

* cited by examiner

*Primary Examiner*—Kenneth B. Wells
(74) *Attorney, Agent, or Firm*—Nixon Peabody LLP; Donald R. Studebaker

(57) ABSTRACT

A differential current driver has a current source that supplies current selectively to two output terminals according to data to be transmitted. A comparison circuit compares the current output by the current source with a reference value and generates a control signal. Responding to the control signal, a current adjustment circuit adjusts the current supplied to the two output terminals by, for example, shunting part of the current to ground, or by adjusting a bias voltage that controls the current output of the current source. A switching circuit may shunt all of the current output by the current source during a brief period preceding output of current from the output terminals. These operations take place around transitions from the output disabled state to the output enabled state, and avoid the output of excessive current just after such transitions.

22 Claims, 14 Drawing Sheets

DIFFERENTIAL CURRENT DRIVER AND DATA TRANSMISSION METHOD

BACKGROUND OF THE INVENTION

1. Field of the Invention

The present invention relates to a differential current driver and a method of using the differential current driver to transmit data.

2. Description of the Related Art

It is known art to use low voltage differential signaling to transmit data between communication devices or large-scale integrated circuit (LSI) devices. This type of transmitting and receiving of data will be described with reference to FIG. 12. Data transmission is carried out by a differential driver 1 that switches output current between two output terminals (referred to as positive and negative terminals) of the transmitting device 40. The current is conducted by a twisted pair cable 45 to the receiving device 50, where it generates voltages at corresponding (positive and negative) input terminals linked by a terminating resistor (not shown). A receiver 51 in the receiving device 50 compares the voltages at these input terminals in order to determine the value of the received data (Rcv_DATA).

FIG. 13 shows the internal structure of the differential driver 1. The differential driver 1 includes a p-channel metal-oxide-semiconductor (PMOS) transistor 2 that operates as a current source (and will be referred to below as a current source 2), PMOS transistors 3 and 4 (referred to below as switches 3 and 4), NAND gates 8 and 9, and inverters 6 and 7. The switches 3 and 4 switch the current output from the current source 2 between the positive (POS) and negative (NEG) output terminals according to a binary data signal received at a data input terminal. The inverters 6 and 7 invert the data signal. The NAND gates 8 and 9 control switches 3 and 4 according the data signal, the inverted data signal, and an output enable (OE) signal received at an output enable input terminal for output enable/disable control of the differential driver 1. When the OE signal is high, one of the two switches 3 and 4 is turned on according to the data signal, and current is output from the corresponding output terminal. When the OE signal goes low, both switches 3 and 4 are turned off, and no current is output.

When the differential driver 1 is switched from the output disabled state to the output enabled state, it takes time for the operation of the current source 2 to stabilize. For that reason, in a device that transmits and receives data at high speed, the internal structure of the differential driver 1 may be altered as shown in FIG. 14. In FIG. 14, when the differential driver 1 is in the output disabled state, a PMOS transistor 14 (referred to below as a switch 14) is turned on, allowing the current from the current source 2 to escape to ground. Current therefore flows from the current source 2 at all times, irrespective of the output state of the differential driver 1. Differing from the structure in FIG. 13, the structure in FIG. 14 eliminates the need to wait for stabilization of the current source 2 when the differential driver is switched from the output disabled state to the output enabled state, and high-speed data transfer becomes possible. These structures are disclosed in Japanese Unexamined Patent Application Publication Nos. 8-204557 and 2000-332610.

In the structure shown in FIG. 13, when the differential driver 1 is in the output disabled state, since the switches 3 and 4 are both turned off, the voltage at their common node N is substantially equal to the power supply voltage (VDD). When the differential driver 1 transitions from this state to the output enabled state, since one of the switches 3 and 4 is turned on, the voltage at the common node N decreases. This node is the also drain node of the current source 2, however. Since the gate and drain of a PMOS transistor are capacitively coupled, when the voltage at the common node N decreases (i.e., the drain voltage of the current source 2 decreases), the bias voltage at the gate of the current source 2 also decreases. As a result, the current flow from the current source 2 increases. For this reason, until the bias voltage returns to its normal level, more current than is required flows from the positive output terminal or the negative output terminal.

In the structure shown in FIG. 14, the increase in output current accompanying a transition of the differential driver from the output disabled state to the output enabled state is prevented, but the differential driver consumes much current, since current flows from the current source 2 at all times.

SUMMARY OF THE INVENTION

A general object of the present invention is to transmit data at high speed with low power consumption.

A more specific object is to prevent the output of excess current at a transition from the output disabled state to the output enabled state of a differential current driver without significantly increasing the current consumption of the differential current driver.

In a first aspect of the invention, a differential current driver has two output terminals, a current source supplying current through two switches to the two output terminals, and a circuit for selectively closing the two switches according to data to be transmitted. A comparison circuit compares the current output by the current source with a reference value and thereby generates a control signal. A current adjustment circuit adjusts the current supplied from the current source to the two output terminals responsive to the first control signal.

The current adjustment circuit may include, for example, a transistor for shunting part of the current output by the current source to a node, such as a ground node, different from the two output terminals.

Alternatively, the current adjustment circuit may include a transistor for adjusting a bias voltage that controls the current output of the current source.

In a second aspect of the invention, the differential current driver receives a first command signal indicating validity of the data to be output and a second command signal for enabling and disabling the two switches. A switching circuit conducts the current output by the current source to a node different from the two output terminals while the first command signal indicates that the data to be output are valid but the second command signal disables the two switches.

These two aspects of the invention may be combined.

DETAILED DESCRIPTION OF THE INVENTION

Figure 1:
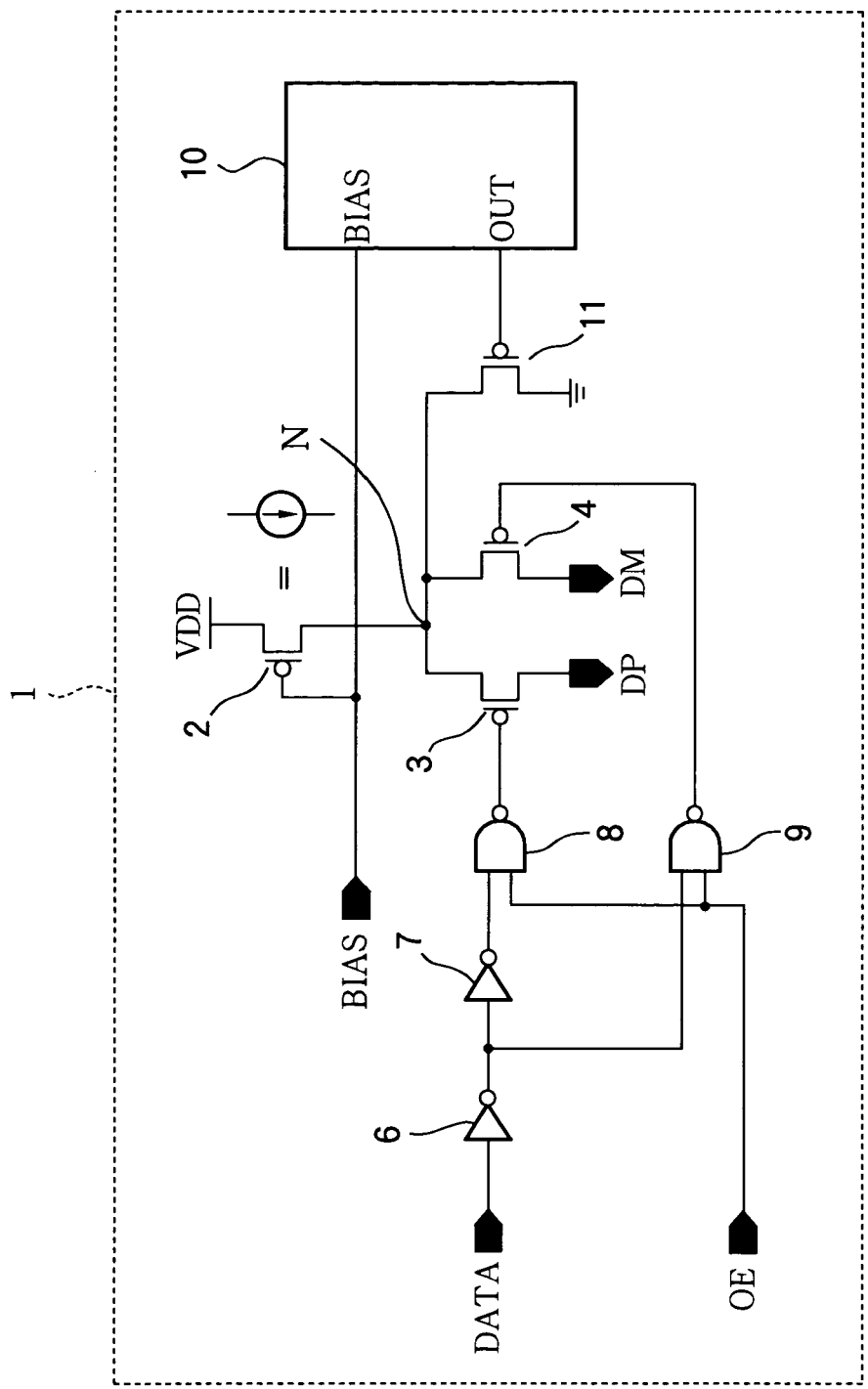
FIG. 1 is a circuit diagram showing the structure of a differential current driver according to a first embodiment of the invention.

Embodiments of the invention will now be described with reference to the attached drawings, in which like elements are indicated by like reference characters.

FIRST EMBODIMENT

FIG. 1 shows the structure of a differential current driver according to a first embodiment of the invention. The data input terminal is connected to the input terminal of an inverter 6, the output terminal of which is connected to the input terminal of an inverter 7 and one input terminal of a two-input NAND gate 9; the output terminal of inverter 7 is connected to one input terminal of another two-input NAND gate 8. The second input terminals of the two-input NAND gates 8, 9 are both connected to an output enable (OE) input terminal. A bias input terminal is connected to the gate terminal of a current source 2 that outputs a current corresponding to the received bias voltage. For compliance with revision 2.0 of the Universal Serial Bus specification (USB 2.0), the output current is set to approximately 17.8 mA. The output current of the current source 2 is generally set by use of a current mirror circuit (not shown) that generates the bias voltage.

The source terminal of the current source 2 is connected to a power supply (VDD) node. The gate terminal of a switch 3 is connected to the output terminal of two-input NAND gate 8; the drain terminal of switch 3 is connected to a positive data (DP) output terminal. The gate terminal of a switch 4 is connected to the output terminal of two-input NAND gate 9; the drain terminal of switch 4 is connected to a negative data (DM) terminal. The drain terminal of the current source 2 is connected to the source terminals of the switches 3 and 4 and the source terminal of an output current adjustment transistor 11. The bias input terminal is also connected to the bias terminal of a comparison circuit 10. The output terminal of the comparison circuit 10 is connected to the gate terminal of the output current adjustment transistor 11; the drain terminal of the output current adjustment transistor 11 is connected to ground.

The comparison circuit 10 uses the bias voltage that controls the current source 2 to compare the current output by the current source 2 with a reference value, and outputs a control signal according to the comparison result. The output current adjustment transistor 11 adjusts the external current flow from the DP terminal or the DM terminal by shunting part of the output current of the current source 2 to ground, based on the value of the control signal output by the comparison circuit 10. When the OE signal indicates the output disabled state, in which no output current may flow from the DP terminal or the DM terminal, both of the switches 3 and 4 are turned off, and the voltage at their common node N is substantially equal to the power supply voltage (VDD). When the differential current driver transitions from this state to the output enabled state, one of the switches 3 and 4 turns on responsive to the data signal, and the voltage at the common node N abruptly decreases. The bias voltage at the gate of the current source 2 also decreases due to gate-to-drain capacitive coupling in the current source 2. As a result, the output current of the current source 2 increases. For this reason, without current adjustment, more current than required would be output from the DP terminal or the DM terminal, until the bias voltage returned to its normal level.

Figure 12:
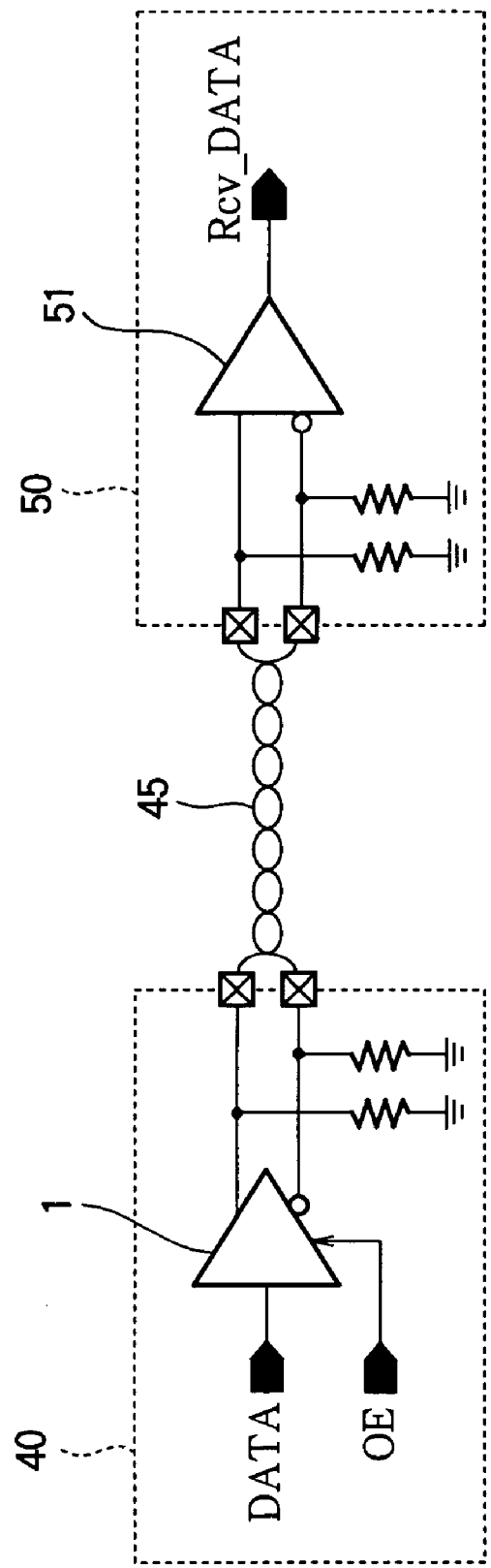
FIG. 12 is a circuit diagram showing a system for transmitting and receiving data using low voltage differential signaling.
Figure 13:
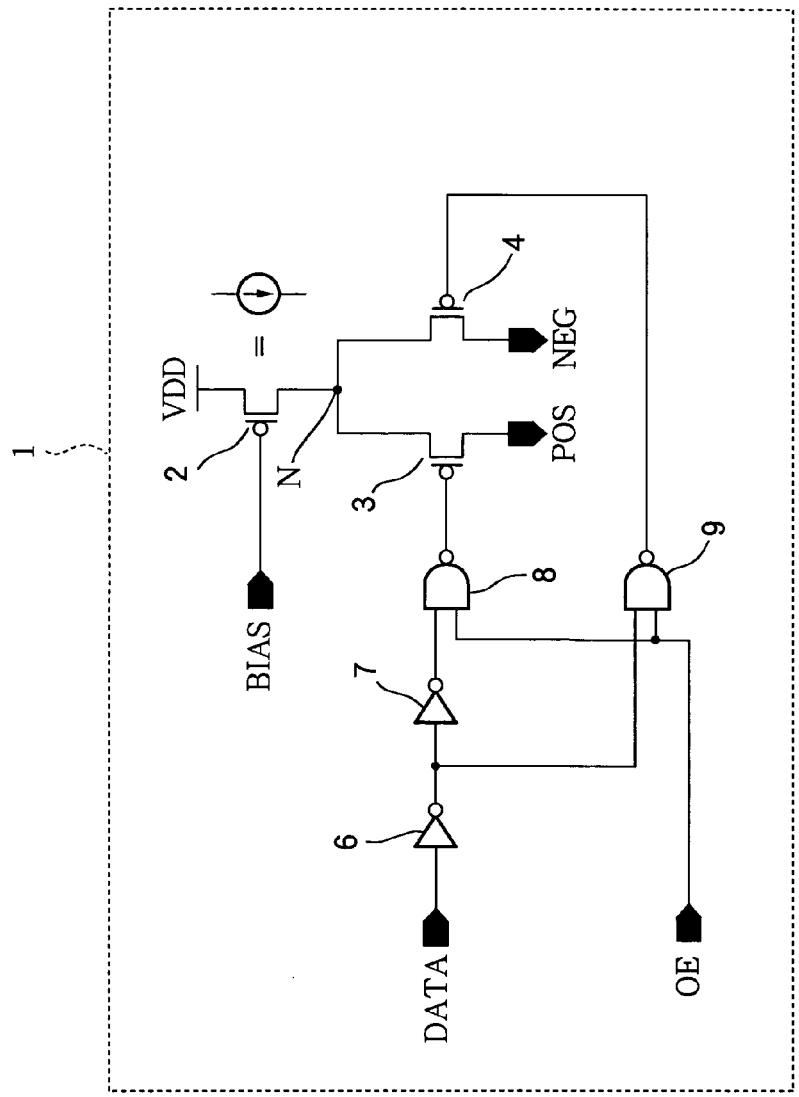
FIG. 13 is a circuit diagram showing the structure of a conventional differential current driver.

In this embodiment, however, the comparison circuit 10 determines the amount of current being output by the current source 2. When the current source 2 outputs too much current, the excess current from the current source 2 is shunted to ground through the output current adjustment transistor 11. The external current flow from the DP and DM terminals can thus be maintained at a predetermined level. The current output from the DP terminal or the DM terminal is conducted through a twisted pair cable to a terminating resistor in a receiving device to generate voltages at corresponding (positive and negative) input terminals, enabling a differential receiver in the receiving device to receive the data by comparing the generated voltages, as illustrated in FIG. 12.

Figure 2:
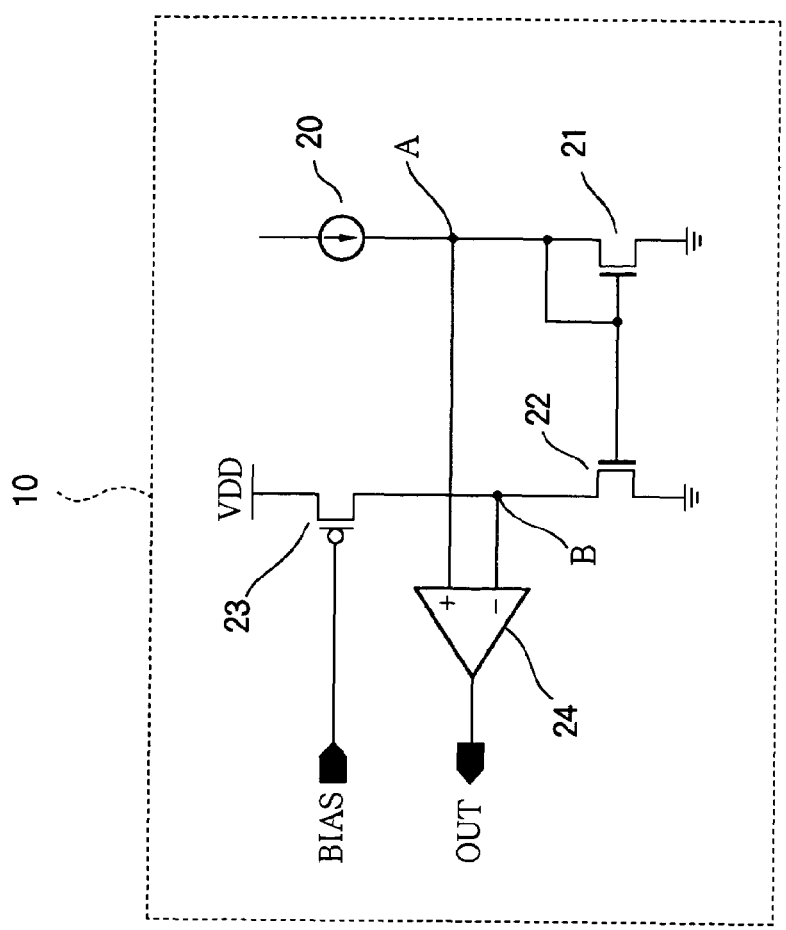
FIG. 2 is a circuit diagram showing the internal structure of the current comparison circuit in FIG. 1.

FIG. 2 shows the circuit configuration of the comparison circuit 10. The output terminal of a reference current source 20 is connected to the drain and gate terminals of an n-channel metal-oxide-semiconductor (NMOS) transistor 21, the gate terminal of another NMOS transistor 22, and the non-inverting input terminal of a differential amplifier 24. The bias input terminal is connected to the gate terminal of a PMOS transistor 23; the source terminal of the PMOS transistor 23 is connected to the VDD node; the drain terminal of the PMOS transistor 23 is connected to the drain terminal of NMOS transistor 22 and the inverting input terminal of the differential amplifier 24; and the output terminal of the differential amplifier 24 is connected to the output terminal of the comparison circuit 10.

Since the conductivity of the current source 2 and the conductivity of PMOS transistor 23 are controlled by the same bias signal, the drain current of PMOS transistor 23 mirrors the output current of the current source 2, being proportional to the output current of the current source 2. The dimensions of the current source 2 and PMOS transistor 23 are selected so that the drain current of PMOS transistor 23 is less than the output current of the current source 2.

The NMOS transistors 21 and 22 constitute a pair of loads that convert the current supplied by the reference current source 20 and the drain current of PMOS transistor 23 to voltage signals for input to the differential amplifier 24. When these two voltage signals are equal, the differential amplifier 24 outputs the power supply voltage (VDD).

Figure 3:
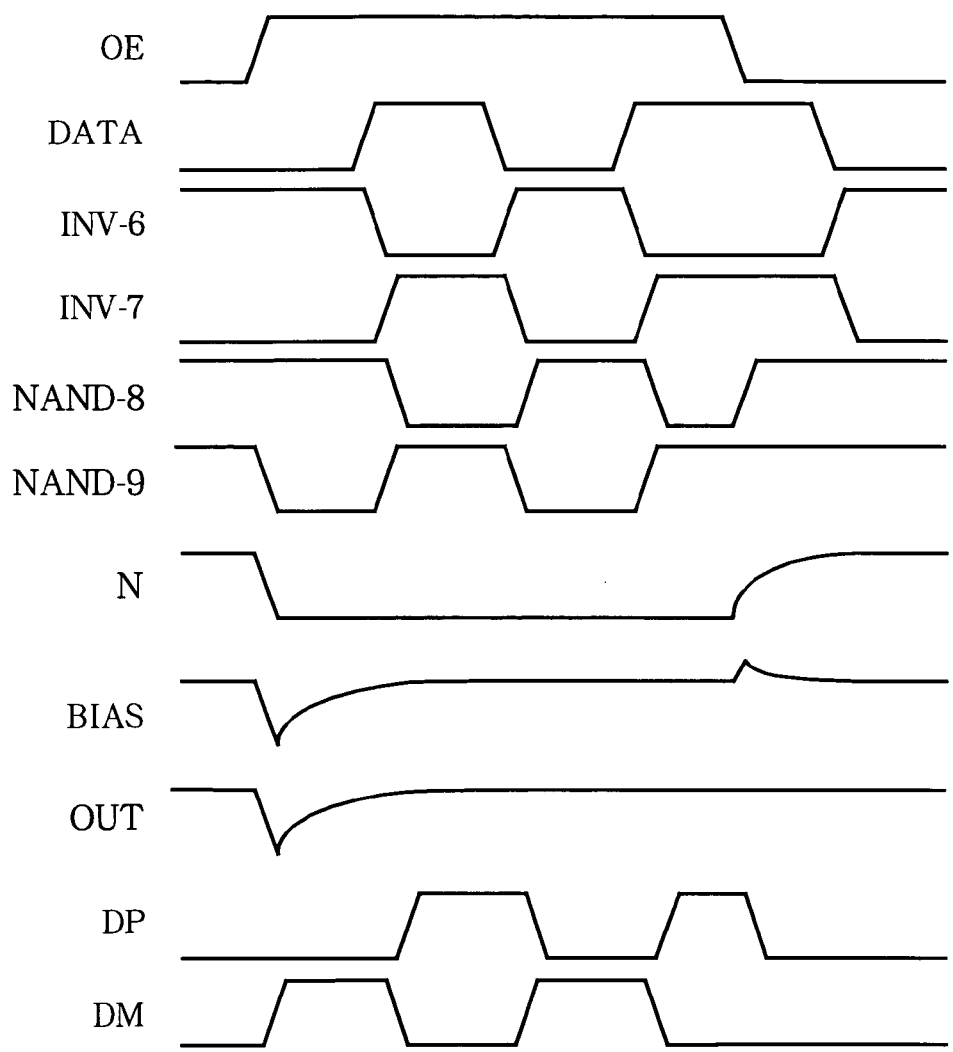
FIG. 3 is a timing diagram explaining the operation of the differential current driver in FIG. 1.

Next, the operation of the differential current driver will be described with reference to the timing diagram in FIG. 3, which shows exemplary waveforms of the OE signal, the data input signal, the output voltage (INV-6) of inverter 6, the output voltage (INV-7) of inverter 7, the output voltage (NAND-8) of NAND gate 8, the output voltage (NAND-9) of NAND gate 9, the voltage at the common node N, the bias voltage at the gate terminal of the current source 2 and the bias input terminal of the comparison circuit 10, the control voltage (OUT) output from the comparison circuit 10, and the currents output from the DP and DM terminals.

When the OE signal is low, both switches 3 and 4 are turned off, so the voltage at the common node N becomes substantially equal to the power supply voltage (VDD). When the OE signal input from the OE input terminal goes from low to high, one of the two output signals of the two-input NAND gates 8 and 9 goes low, according to the level of the data signal input from the data input terminal, and one of the switches 3 and 4 is turned on, so that current is output externally from the DP terminal or the DM terminal. In FIG. 3, the data signal is low when the OE signal goes high, so the output signal of two-input NAND gate 9 goes low and switch 3 turns on. Current therefore flows from the current source 2 out through the DM terminal.

When the OE signal goes high and switch 3 is turned on, the voltage at the common node N decreases, as described above. Accompanying this transition, the bias voltage also decreases due to the gate-to-drain capacitance of the current source 2, or the capacitance between the bias terminal and the common node N. When the bias voltage decreases, the output current of the current source 2 increases. Since the drain current of PMOS transistor 23 in the comparison circuit 10 is proportional to the output current of the current source 2, the drain current of PMOS transistor 23 increases correspondingly.

If the drain current of PMOS transistor 23 is larger than the reference current output by the reference current source 20, the voltage at node B in FIG. 2, to which the drain terminals of PMOS transistor 23 and NMOS transistor 22 are connected, becomes higher than the voltage at node A, through which the output of the current source 20 is coupled to the drain terminal of NMOS transistor 21. The differential amplifier 24 reduces its output voltage from the power supply voltage (VDD) to a lower voltage according to the voltage difference between nodes A and B. Thus, when the bias voltage decreases, the control voltage output from the comparison circuit 10 decreases, and the output current adjustment transistor 11 begins to conduct part of the current output from the current source 2 to ground. The amount of current shunted to ground varies depending on the output voltage of the differential amplifier 24.

As described above, when the comparison circuit 10 detects that more current is flowing from the current source 2 than is required, it reduces the voltage at its output terminal, thereby turning on the output current adjustment transistor 11, and the output current adjustment transistor 11 routes the excess current to ground, thereby enabling the current output from the DP and DM terminals to be maintained at a desired value.

When the bias voltage returns to its normal level, the output voltage at the output terminal of the comparison circuit 10 returns to the VDD level, so that the shunting of current through the output current adjustment transistor 11 stops. Thereafter, the output signals of the two-input NAND gates 8 and 9 vary according to the changes in the level of the data signal; one of the switches 3 and 4 is always turned on, so that the current flows out from the DP terminal or the DM terminal.

When the OE signal goes from high to low, the output signals of the two-input NAND gates 8 and 9 both go high, and both of the switches 3 and 4 are turned off. The voltage at the common node N increases until it becomes substantially equal to the power supply voltage (VDD). Although the bias voltage increases due to gate-to-drain capacitive coupling in the current source 2, no current is output from the DP terminal or the DM terminal, so there is no need to operate the output current adjustment transistor 11. The control voltage output from the comparison circuit 10 remains at the VDD level, and the output current adjustment transistor 11 remains switched off.

Instead of using the output current of the current source 2 for comparison or monitoring, the first embodiment uses the proportional but smaller drain current of the PMOS transistor 23 in the comparison circuit 10. Thus, current consumption can be reduced.

As described above, according to the first embodiment, when the output current of the current source 2 increases at the start of data transmission, the extra current is shunted to ground, keeping the external current flow from the DP terminal or the DM terminal within a desired range.

SECOND EMBODIMENT

Figure 4:
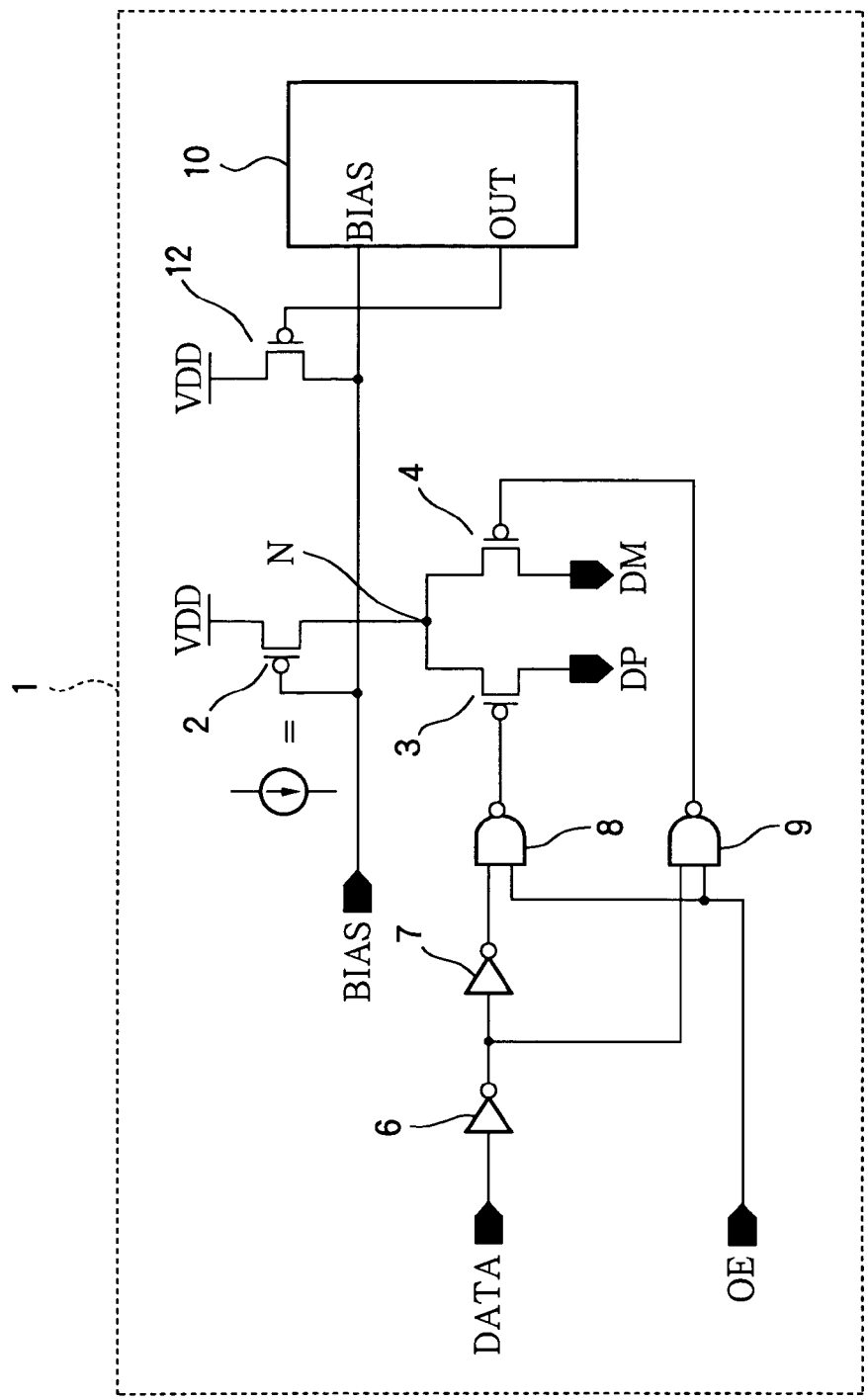
FIG. 4 is a circuit diagram showing the structure of a differential current driver according to a second embodiment of the invention.

FIG. 4 shows the structure of a differential current driver according to a second embodiment of the invention. Instead of shunting excess current to ground as in the first embodiment, the second embodiment directly controls the value of the current output from the DP or DM terminal.

As shown in FIG. 4, the bias input terminal of the differential current driver 1 is connected to the gate terminal of the current source 2, the bias input terminal of the comparison circuit 10, and the drain terminal of a transistor for adjusting the bias voltage (referred to below as a bias adjustment transistor 12). The source terminal of the bias adjustment transistor 12 is connected to a VDD node. The output terminal of the comparison circuit 10 is connected to the gate terminal of the bias adjustment transistor 12. As described before, since the bias voltage decreases at the start of data transmission, because of the influence of the gate-to-drain capacitance in the current source 2 or the capacitance between the bias terminal and the common node N, more current than necessary flows from the DP or DM terminal until the operation of the current source 2 is stabilized. As in the first embodiment, the comparison circuit 10 uses the bias voltage to perform an internal comparison, thereby determining whether the output current of the current source 2 exceeds a reference value, and outputs a voltage signal according to the result of the comparison. The comparison circuit 10 has the same internal structure as in the first embodiment, shown in FIG. 2. In the second embodiment, however, the output voltage signal is applied to the gate terminal of the bias adjustment transistor 12, thereby adjusting the bias voltage.

Next, the operation of the second embodiment will be described. When the bias voltage decreases at the start of data transmission as in the first embodiment, the output current of PMOS transistor 23 in the comparison circuit 10 becomes larger than the reference current. As a result, the voltage at node B in FIG. 2 becomes higher than the voltage at node A, causing the differential amplifier 24 to reduce its output voltage from the power supply voltage (VDD) to a lower voltage. The source-to-gate voltage of the bias adjustment transistor 12 accordingly increases, causing the bias adjustment transistor 12 to conduct, thereby pulling the bias voltage back up. When the bias voltage increases sufficiently that the output current of PMOS transistor 23 becomes equal to or less than the reference current of the reference current source 20, the differential amplifier 24 outputs a voltage substantially equal to VDD. Thus, when the bias voltage returns to its normal level, the bias adjustment transistor 12 stops conducting, terminating the operation of adjusting the bias voltage.

As described above, according to the second embodiment, when the output current of the current source 2 increases at the start of data transmission, the bias voltage is automatically adjusted to prevent more than the necessary amount of current from flowing externally from the DP terminal or the DM terminal. The output current of the differential current driver 1 can thereby be kept within a desired range. In the first embodiment, the current output from the DP or DM terminal varies according to the driving capability of the output current adjustment transistor 11, which varies according to manufacturing variations and variations in ambient conditions. These output current variations are eliminated in the second embodiment, which directly controls the output current of the current source 2.

THIRD EMBODIMENT

Next, a macrocell including a differential current driver according to a third embodiment of the present invention will be described. The macrocell is herein assumed to be compliant with the UTMI specification (USB 2.0 Transceiver Macrocell Interface specification, version 1.05). The macrocell will be referred to below as a physical layer (PHY) macrocell.

Figure 5:
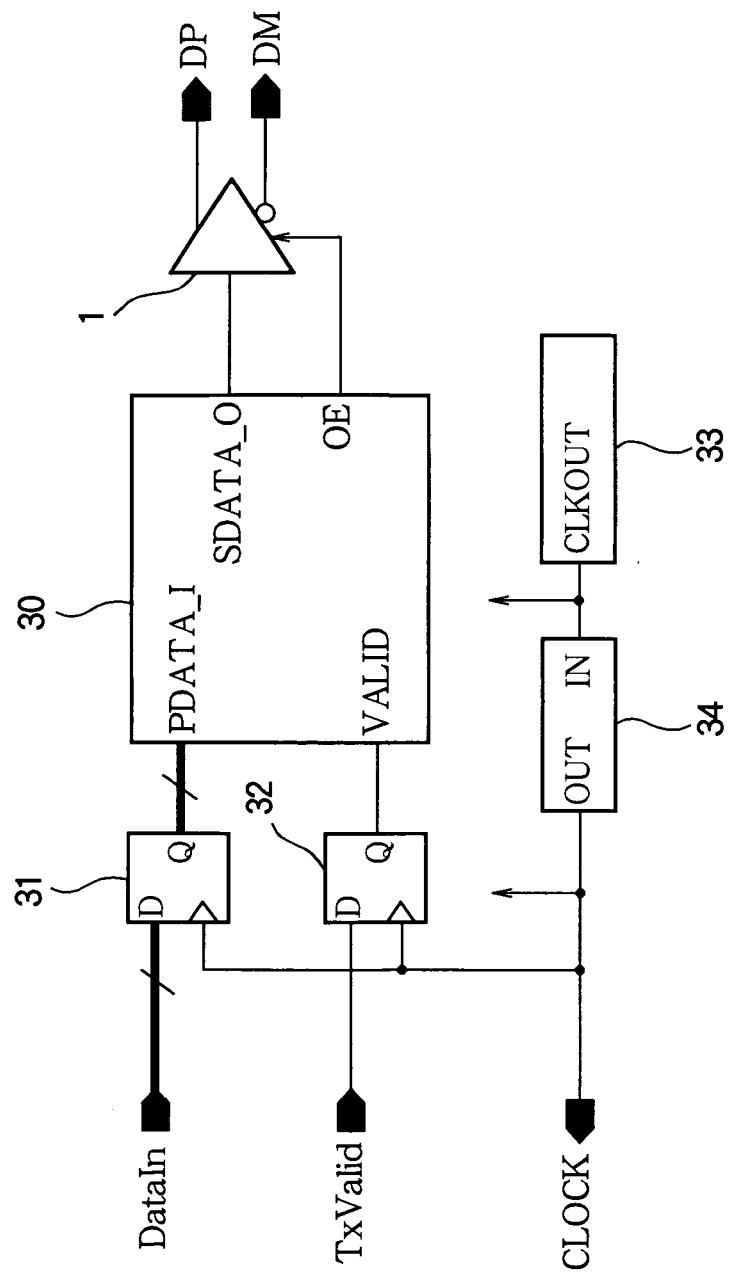
FIG. 5 is a circuit diagram showing the structure of a known type of macrocell.

First, the UTMI specification for data transmission will be outlined with reference to FIG. 5, which schematically shows the internal structure of the PHY macrocell. As shown in FIG. 5, the PHY macrocell includes a differential current driver (also referred to as a high-speed or HS driver) 1, a packet generation circuit 30, flip-flops 31 and 32, a phase-locked loop (PLL) circuit 33, and a frequency divider circuit 34.

When data transmission is performed in the high-speed mode according to the UTMI specification, the PHY macrocell receives parallel data at a frequency of 30 MHz or 60 MHz from a host controller (not shown), performs parallel-to-serial conversion, and outputs serial data at a frequency of 480 MHz. These operations are enabled by a TxValid signal received from the host controller. The PHY macrocell latches and thus recognizes the level of the TxValid signal at the rise of a data clock signal.

When transmitting a data packet, the packet generation circuit 30 converts parallel data input from a DataIn terminal to serial form, generates a synchronization (sync) pattern, and performs NRZI (Non Return to Zero Invert) encoding and bit stuffing. At the end of the packet, the packet generation circuit 30 also generates an EOP (End of Packet) signal. The packet generation circuit 30 sends the serial packet data from a serial data output (SDATA_O) terminal to the high-speed driver 1, and also sends the high-speed driver 1 an output enable (OE) signal. To transmit data, the packet generation circuit 30 activates the OE signal and outputs serial data; the high-speed driver 1 outputs a corresponding low voltage differential signal from the DP and DM terminals. When not transmitting data, the packet generation circuit 30 inactivates the OE signal, and the output of the high-speed driver 1 is placed in the high-impedance state.

These operations are synchronized with a high-frequency clock signal output from the PLL circuit 33 and a lower-frequency clock signal output by the frequency divider circuit 34. Both clock signals are supplied to the packet generation circuit 30. The lower-frequency clock signal is supplied to the flip-flops 31, 32, and is also output from a clock output terminal as the data clock signal.

The UTMI specification recommends that a delay of eight to sixteen data clock periods be allowed at the start of data transmission, from the time when the active TxValid signal is first received and latched by the PHY macrocell at the rise of the data clock signal to initial output of the low voltage differential signal from the DP and DM terminals. Accordingly, the packet generation circuit 30 needs to generate a packet within this time frame.

Figure 6:
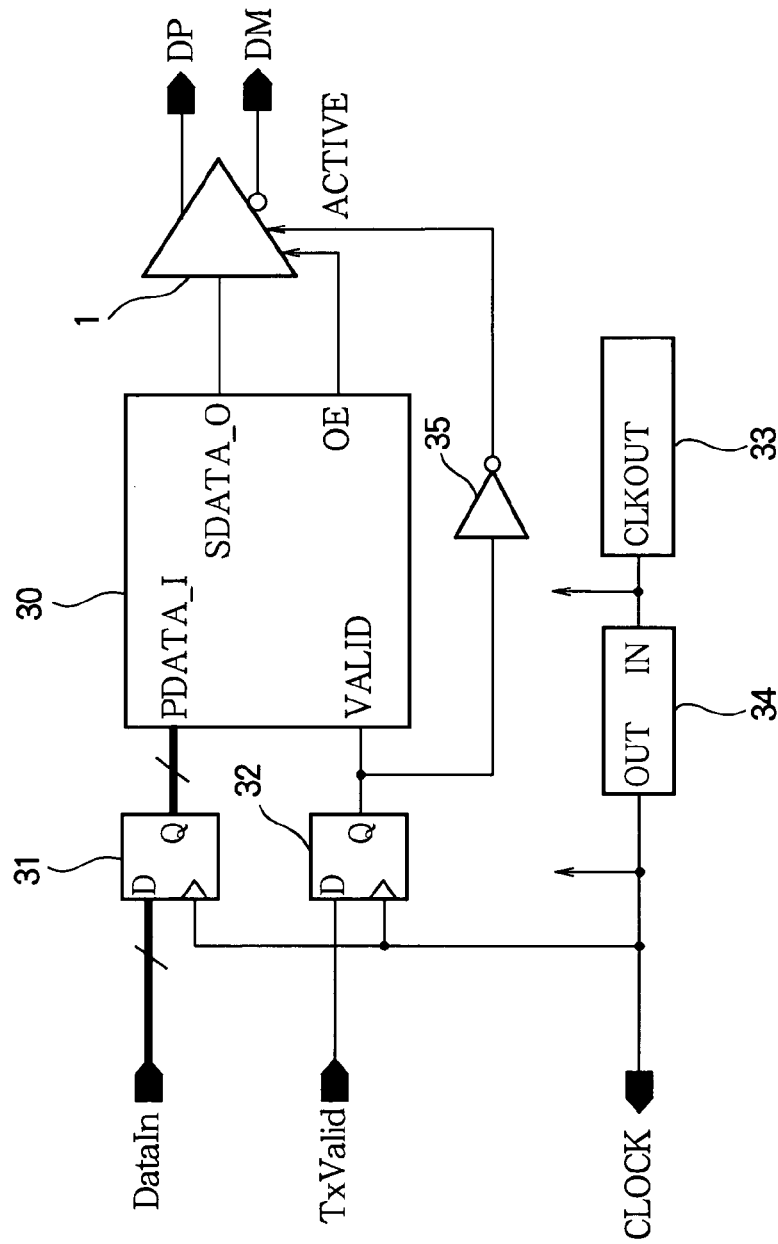
FIG. 6 is a circuit diagram showing the structure of a macrocell according to a third embodiment of the invention.

FIG. 6 shows the structure of the third embodiment of the present invention. Like the conventional macrocell shown in FIG. 5, the macrocell in the third embodiment includes a differential current driver or high-speed driver 1, a packet generation circuit 30, flip-flops 31 and 32, a frequency divider circuit 34, and a PLL circuit 33. Differing from the macrocell in FIG. 5, the macrocell in the third embodiment further includes an inverter 35.

The DataIn terminal that receives parallel data from the host controller is connected to the data input (D). terminal of flip-flop 31, and the TxValid terminal that receives the TxValid signal for controlling data transmission is connected to the D terminal of flip-flop 32. The data output (Q) terminal of flip-flop 31 is connected to the packet data input (PDATA_I) terminal of the packet generation circuit 30; the Q terminal of flip-flop 32 is connected to a VALID input terminal of the packet generation circuit 30 and to the input terminal of the inverter 35.

The SDATA_O terminal of the packet generation circuit 30 is connected to the data input terminal of the high-speed driver 1. The serial data generated by the packet generation circuit 30 are sent from the SDATA_O terminal to the high-speed driver 1. The high-speed driver 1 outputs a low voltage differential signal, corresponding to the logic level of the serial data, from the DP and DM terminals.

The OE terminal of the packet generation circuit 30 is connected to the OE terminal of the high-speed driver 1; the packet generation circuit 30 sends an OE signal from the OE terminal to the high-speed driver 1, thereby enabling and disabling data output from the high-speed driver 1. The output terminal of the inverter 35 is connected to an ACTIVE input terminal of the high-speed driver 1.

Figure 7:
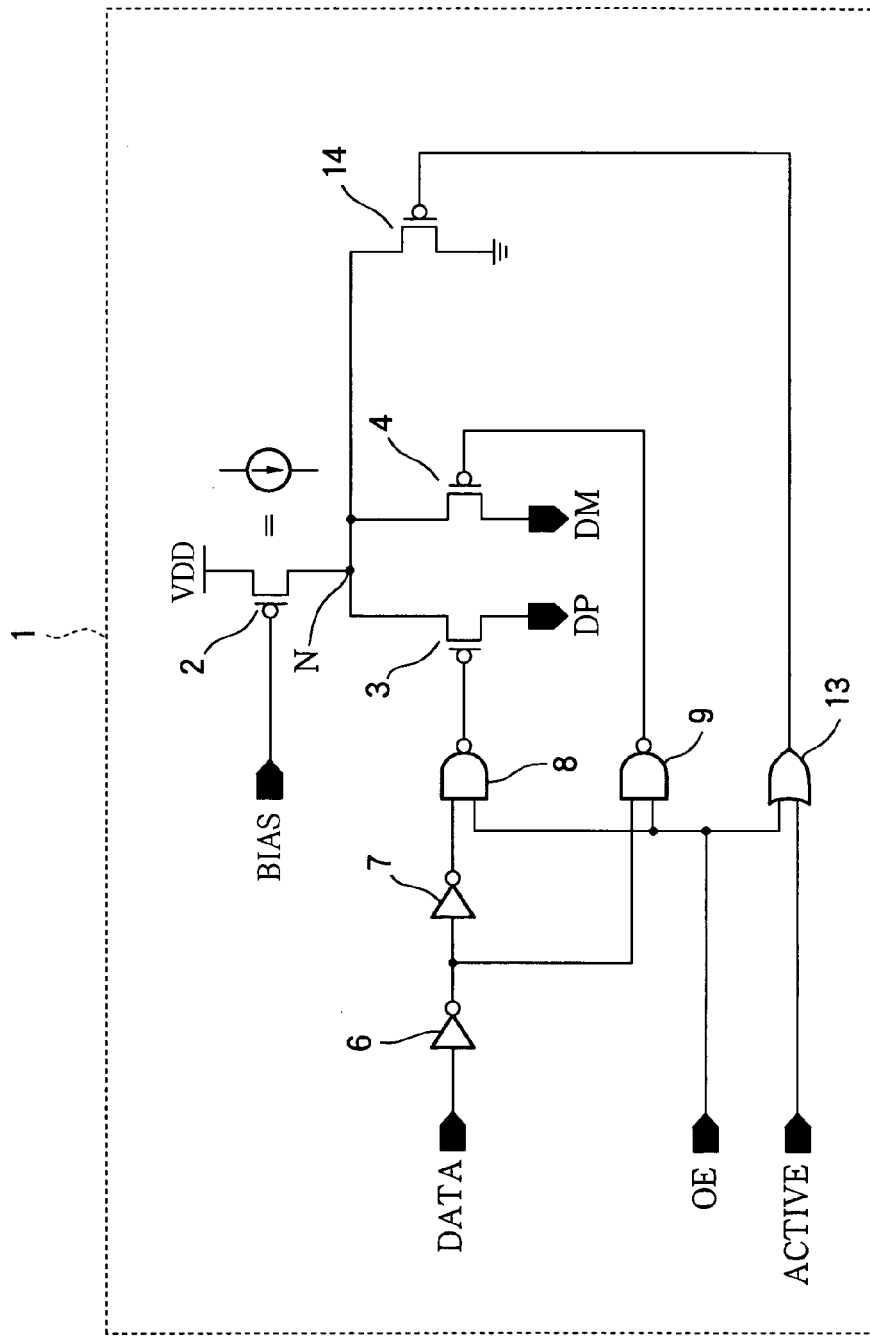
FIG. 7 is a circuit diagram showing the internal structure of the differential current driver in FIG. 6.
Figure 14:
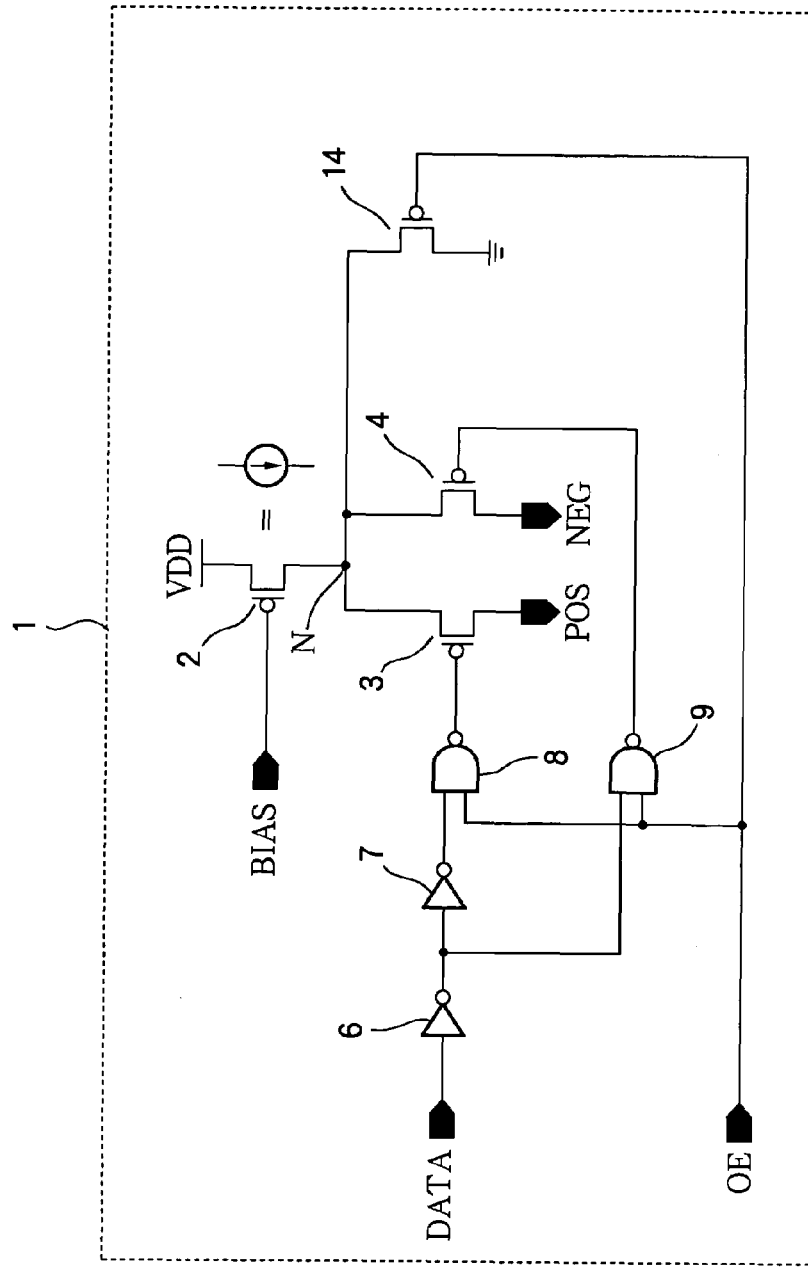
FIG. 14 is a circuit diagram showing the structure of a conventional high-speed differential current driver.

The internal structure of the high-speed driver 1 is shown in FIG. 7. The ACTIVE terminal is connected to one of the input terminals of a two-input OR gate 13; the OE terminal is connected to the other input terminal of the two-input OR gate 13; the output terminal of the two-input OR gate 13 is connected to the gate terminal of a switch 14 similar to the switch 14 in FIG. 14. With this arrangement, output enable/disable control of the high-speed driver 1 and control over the operation of the current source 2 in the high-speed driver 1 can be performed independently.

Figure 8:
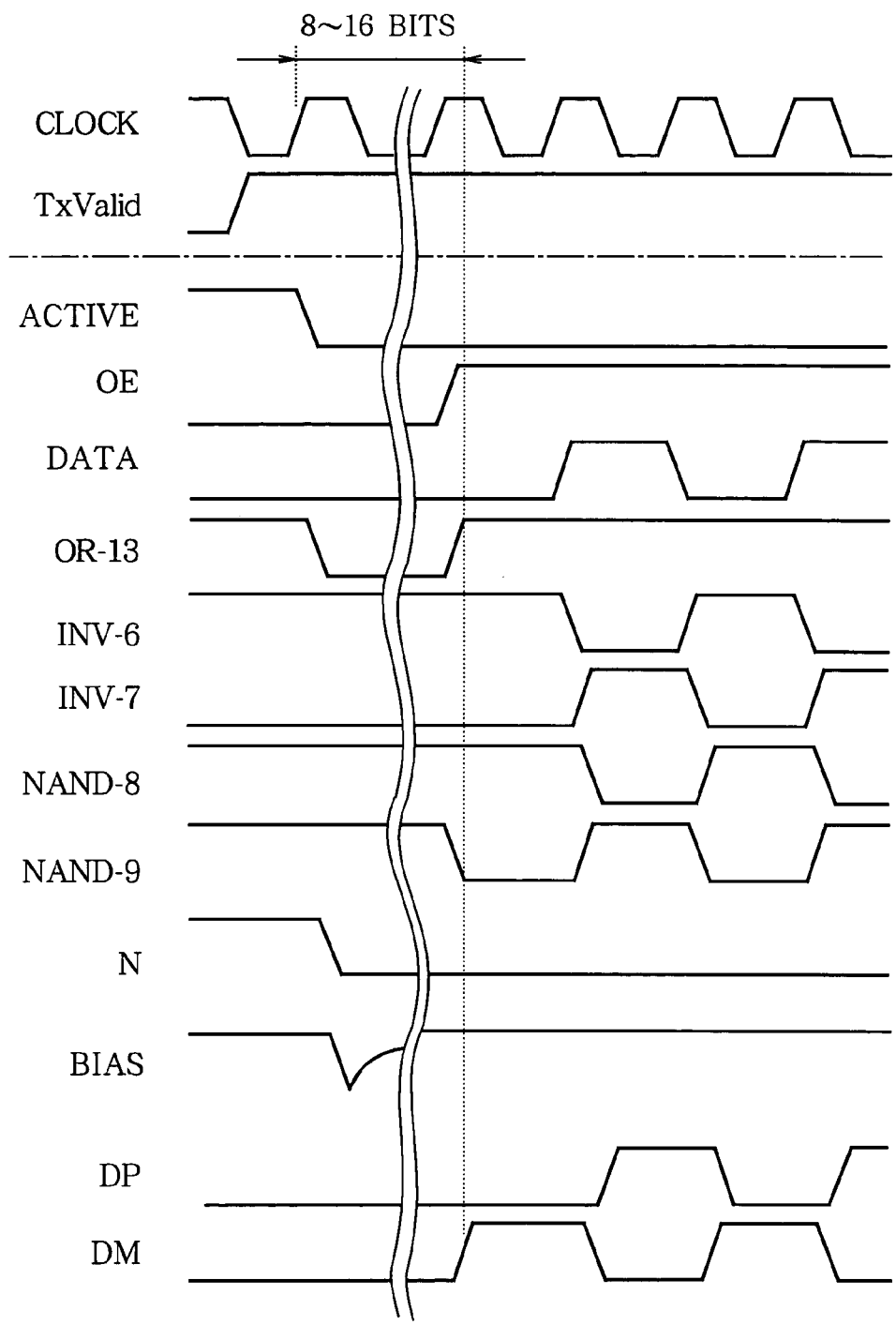
FIG. 8 is a timing diagram explaining the operation of the macrocell in FIG. 6.

The operation of the macrocell in the third embodiment will be described with reference to the timing diagram in FIG. 8.

Before output of the low voltage differential signal from the DP and DM terminals begins, the controller asserts the TxValid signal, which is active high. As already noted, the UTMI specification recommends an eight-bit to sixteen-bit delay from reception of the active TxValid signal by the PHY macrocell at the rise of the data clock signal to output of the low voltage differential signal from the DP and DM terminals. This delay allows time for parallel-to-serial conversion of the parallel data, generation of the sync pattern, NRZI encoding, and bit stuffing. When the PHY macrocell latches the asserted TxValid signal at the rise of the CLOCK signal, the ACTIVE signal goes low, and the output of the two-input OR gate 13 goes low. Switch 14 is thereby turned on, so that the current source 2 begins conducting current, Next, when the packet generation circuit 30 is ready to begin transmitting packet data and therefore sets the OE signal to the high logic level, the output of the two-input OR gate 13 goes high, and switch 14 is turned off. At the same time, one of the output signals of the two-input NAND gates 8 and 9 goes low, according to the data signal, turning on switch 3 or 4. The current output from the current source 2 is therefore output to the DM terminal or the DP terminal.

When the ACTIVE signal goes from high to low, the bias voltage decreases due to the gate-to-drain capacitance of the current source 2, and more current flows from the current source 2 than is required. Immediately after the transition, however, the current flows only to ground through switch 14. By the time the current output by the current source 2 is supplied to the DP terminal or the DM terminal, the current source 2 has been operating long enough for the bias voltage to return to its normal level, and the current source 2 is in a stable state.

Subsequently, the output signals of the two-input NAND gates 8 and 9 vary with changes in the logic level of the data signal. One or the other of switches 3 and 4 is always turned on, so that the output of current from the DP terminal or the DM terminal continues.

As described above, by providing an ACTIVE signal for controlling the shunting of current to ground separately from the OE signal that enables and disables data output from the differential current driver, the third embodiment allows adequate time for the current source 2 to reach a stable state before data output actually starts. The output of current from the current source 2 can therefore be stopped while data transmission is not performed, and current consumption can be reduced accordingly.

FOURTH EMBODIMENT

In the first and second embodiments, there is an input-to-output delay in the comparison circuit 10, which allows excess current to flow from the current source 2 for a brief interval. In the third embodiment as well, if higher-speed data transfer is implemented in the future, the time from the active transition of the TxValid signal to the output of current from the DP terminal or the DM terminal may be reduced to an amount insufficient for stabilizing the operation of the current source 2.

Figure 9:
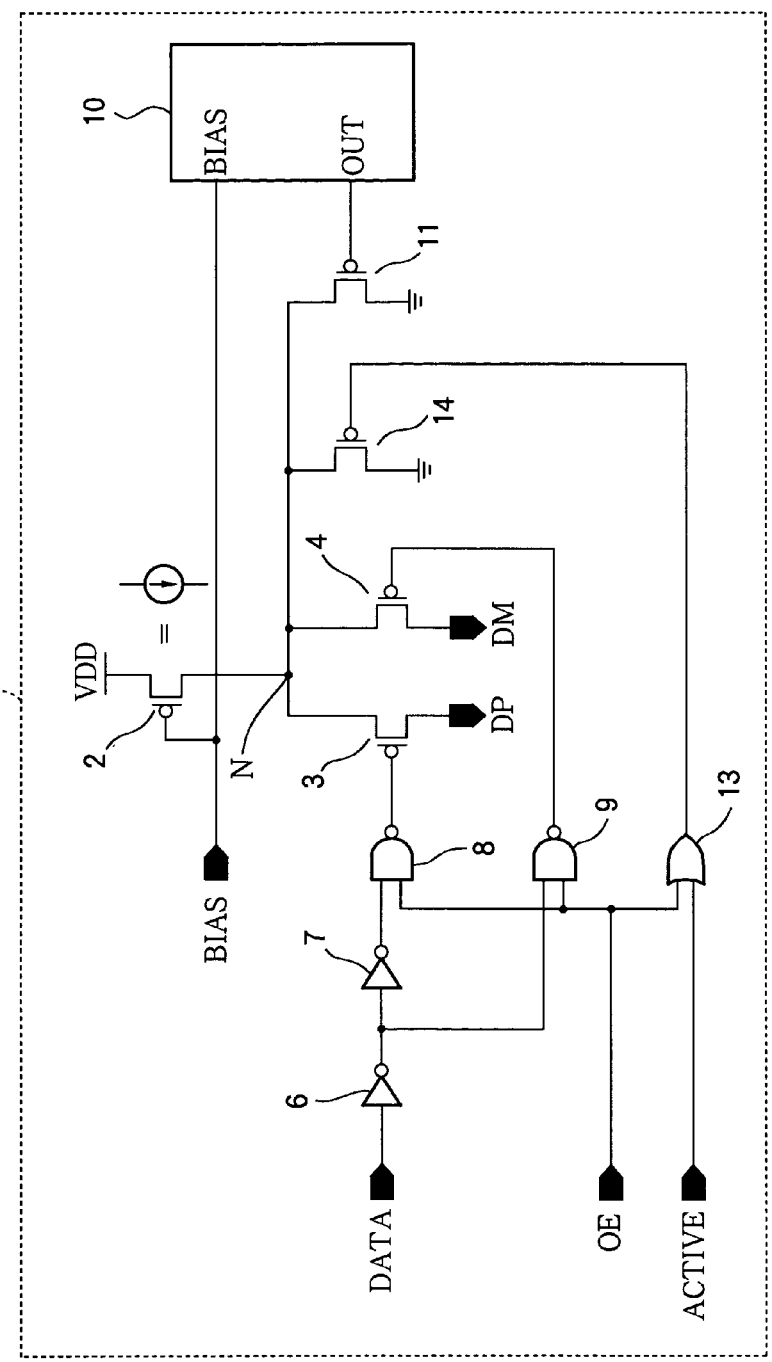
FIG. 9 is a circuit diagram showing the structure of a differential current driver according to a fourth embodiment of the invention.

To remedy these problems, in the fourth embodiment, the comparison circuit 10 and the output current adjustment transistor 11 of the first embodiment are combined with the structure of the high-speed driver 1 in the third embodiment, as shown in FIG. 9.

This structure has the same OR gate 13 and switch 14 as in the third embodiment. Switch 14 turns on to shunt current from the current source 2 to ground during the stabilization period before data transmission begins. As a result, the bias voltage of the current source temporarily drops, so the output current adjustment transistor 11 also begins shunting current to ground, based on the value of the output signal of the comparison circuit 10. If the bias voltage of the current source 2 has not returned to the normal level by the time data transmission actually begins, the output current adjustment transistor 11 continues shunting the appropriate amount of current to ground to adjust the external current flow from the DP terminal or the DM terminal to the correct level.

Before the active transition of the TxValid signal, when there are no data to be transmitted, the operation of the current source 2 is stopped as in the third embodiment. Current consumption can be thereby reduced. Furthermore, even if higher-speed data transfer is implemented in the future and the time from the active transition of the TxValid signal to the output of current from the DP terminal or the DM terminal becomes insufficient for stabilization of the operation of the current source 2, the output current will be adjusted as necessary by the comparison circuit 10 and the output current adjustment transistor 11. Thus, output of more current than is required from the DP terminal or the DM terminal can be prevented.

In the first, second, and fourth embodiments, the comparison circuit 10 shown in FIG. 2 was employed. The structure of the comparison circuit 10, however, is not limited to the structure in FIG. 2; any circuit that outputs a voltage corresponding to a difference between two currents can be employed.

Figure 10:
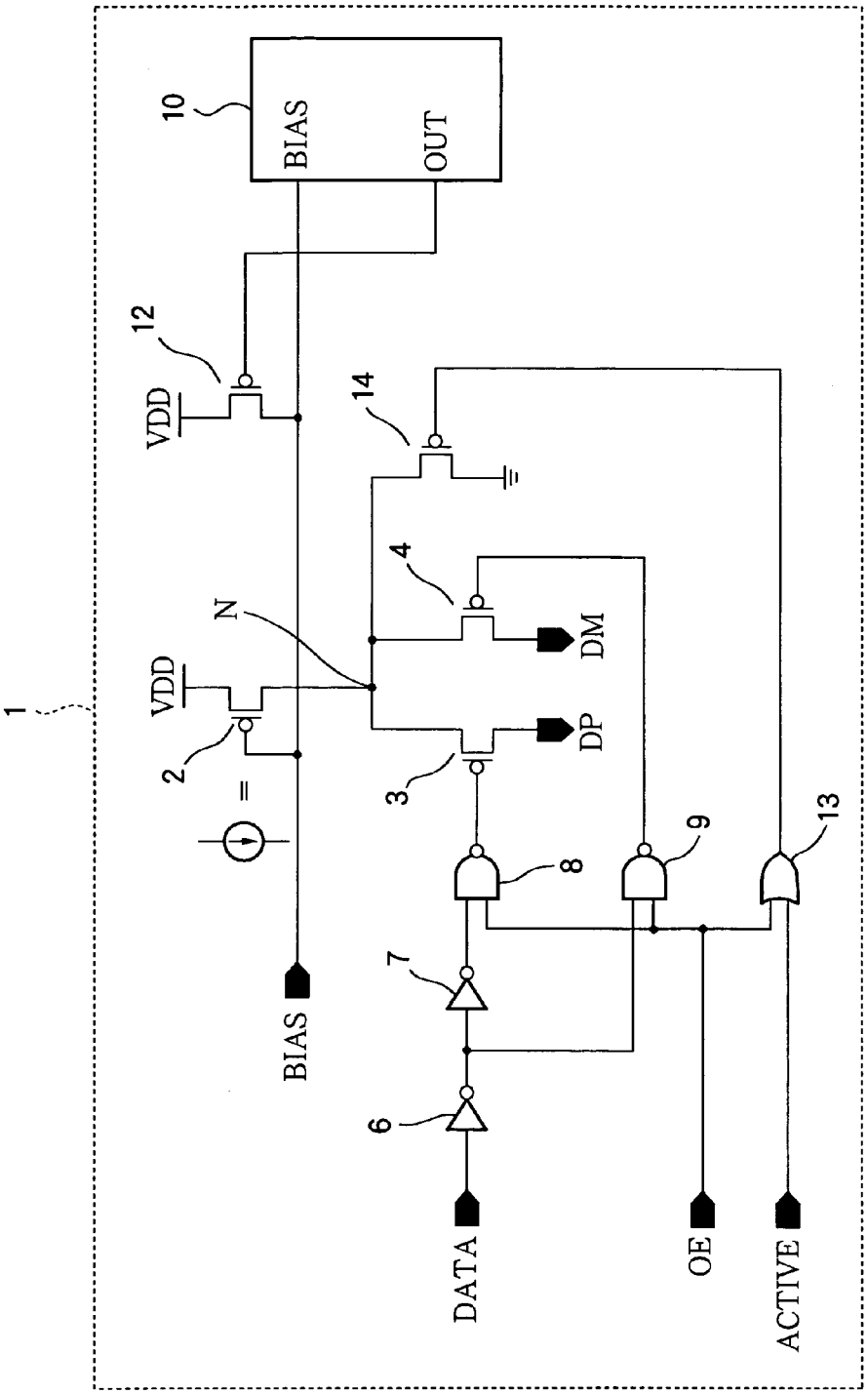
FIG. 10 is a circuit diagram showing a variation of the differential current driver according to the fourth embodiment of the invention.

Though the first and third embodiments were combined in the fourth embodiment, a similar embodiment can be created by combining the second and third embodiments. The high-speed driver in this case is shown in FIG. 10. A description of the operation of the high-speed driver in FIG. 10 will be omitted, since it can be readily understood from the descriptions of the second and third embodiments.

Figure 11:
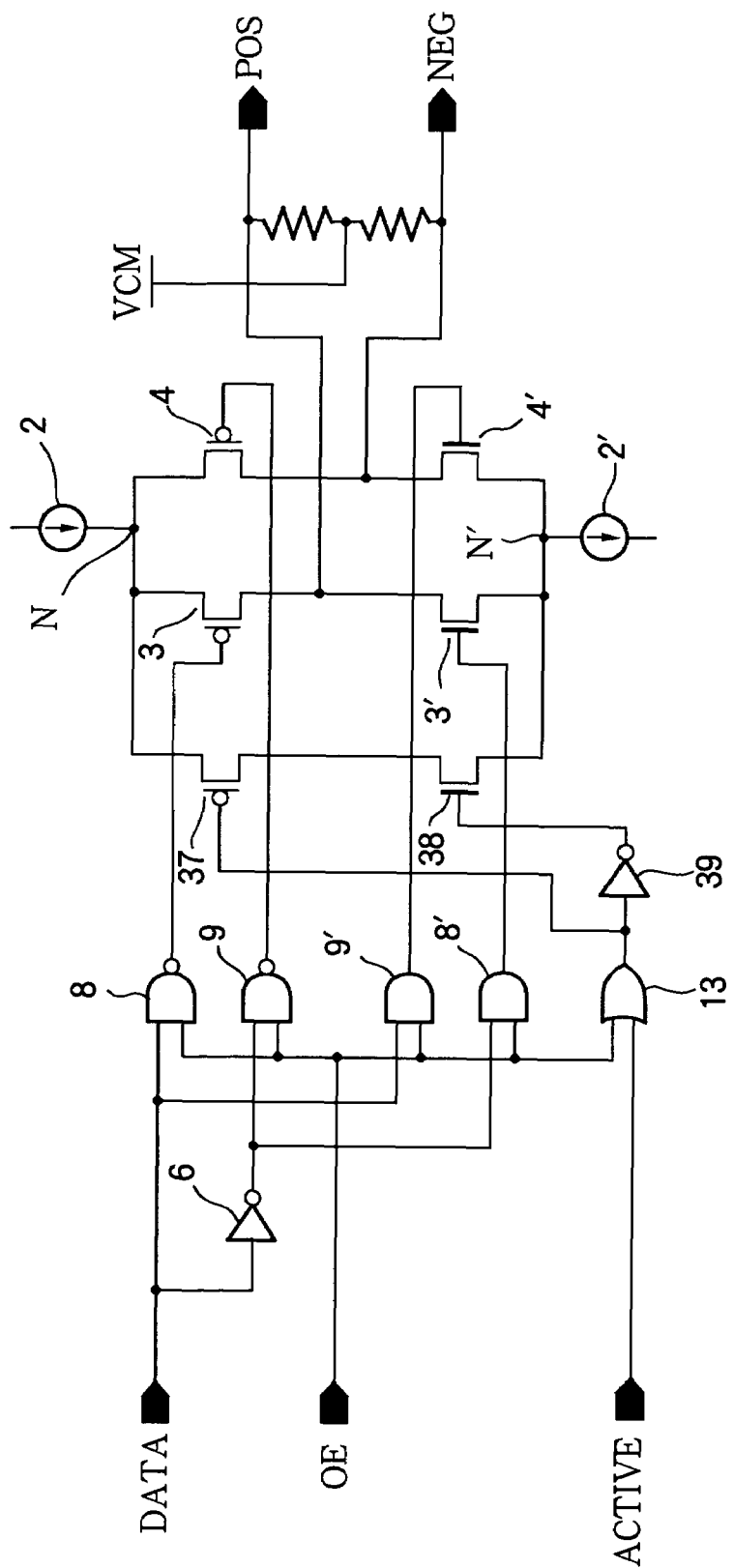
FIG. 11 is a circuit diagram showing the structure of a known standard type of differential current driver.

The above embodiments can be used in a PHY macrocell compliant with the USB 2.0 specification, but the invention can also be applied to other communication interfaces that use low voltage differential current signaling, such as the interface specified by the IEEE 1394 standard. A high-speed driver for the IEEE 1394 standard can have the structure shown in FIG. 11, for example. In this structure, data transmission is performed from two output terminals (POS and NEG) by driving current from a first current source 2 into one of the two output terminals, and pulling current from the other output terminal through a second current source 2'. PMOS transistor switches 3 and 4 and NAND gates 8 and 9 have functions similar to the corresponding elements in the embodiments above; NMOS transistor switches 3' and 4' and AND gates 8' and 9' have complementary functions. The output currents are stabilized by shunting current from the first current source 2 to the second current source 2' through a PMOS transistor switch 37 and an NMOS transistor switch 38. The gate terminal of the PMOS transistor switch 37 receives the logical OR of the OE and ACTIVE signals from an OR gate 13. The gate terminal of NMOS transistor switch 38 receives the logical NOR of the OE and ACTIVE signals from an inverter 39 that inverts the output of OR gate 13. Switches 37 and 38 are coupled in series between the common node N through which current is supplied from the first current source 2 to switches 3 and 4, and a corresponding node N' through which the second current source 2' draws current from switches 3' and 4'.

For data transmission using a differential current driver, the present invention prevents an increase in output current accompanying a transition of the differential current driver from the output disabled state to the output enabled state without significantly increasing the current consumption of the differential current driver, so data can be transmitted at high speed with low power consumption.

A few variations of the above embodiments have already been described, but those skilled in the art will recognize that further variations are possible within the scope of invention, which is defined by the appended claims.

What is claimed is:

1. A differential current driver having two output terminals, a common node, a current source connected directly to the common node and supplying a first current to the common node, two switches connected to the common node and to the two output terminals, and a circuit for selectively closing the two switches according to data to be transmitted, the current source having a control terminal receiving a bias signal, the first current being controlled by the bias signal, the differential current driver comprising:
    a comparison circuit for receiving the bias signal and mirroring the first current to obtain a second current, comparing the second current with a reference value and generating a control signal having a value responsive to a difference between the second current and the reference value; and
    a current adjustment circuit connected to the common node for diverting part of the first current away from the switches responsive to the control signal.

2. The differential current driver of claim 1, wherein the current adjustment circuit comprises a transistor for shunting part of the first current to a node different from the two output terminals and the common node.

3. The differential current driver of claim 2, wherein the node different from the two output terminals and the common node is a ground node, and the transistor has a source terminal connected to the ground node, a gate terminal receiving the control signal, and a drain terminal connected to the common node.

4. The differential current driver of claim 1, wherein the differential current driver receives a first command signal indicating validity of the data to be output and a second command signal for enabling and disabling the two switches, further comprising a switching circuit for conducting the first current to a first node different from the two output terminals while the first command signal indicates that the data to be output are valid but the second command signal disables the two switches.

5. The differential current driver of claim 4, wherein the switching circuit comprises:
    a logic gate for performing a logic operation on the first command signal and the second command signal to generate a switch control signal; and
    a switch controlled by the switch control signal.

6. The differential current driver of claim 5, wherein the first node is a ground node and the switch controlled by the switch control signal is a transistor having a source terminal connected to the first node, a gate terminal receiving the second control signal, and a drain terminal connected to a common node through which the first current passes from the first current source to the two switches.

7. The differential current driver of claim 4, wherein the current adjustment circuit comprises a transistor for shunting part of the first current to a second node different from the two output terminals.

8. The differential current driver of claim 7, wherein the second node is a ground node, and the transistor has a source terminal connected to the second node, a gate terminal receiving the first control signal, and a drain terminal connected to a common node through which the first current passes from the first current source to the two switches.

9. The differential current driver of claim 4, wherein the current source receives a bias voltage controlling the first current, and the comparison circuit comprises:
    a comparison current source for generating a second current responsive to the bias voltage, the second current mirroring the first current;
    a reference current source for generating a reference current;
    a pair of loads for converting the second current to a second voltage and converting the reference current to a third voltage; and
    a differential amplifier for generating the first control signal from the second voltage and the third voltage.

10. The differential current driver of claim 9, wherein the second current is less than the first current.

11. A differential current driver comprising:
    a first transistor connected directly to a first node, the first transistor having a gate electrode connected to a second node;
    a first switch circuit connected to the first node and a first output terminal;
    a second switch circuit connected to the first node and a second output terminal;
    a controller controlling the first and second switch circuits according to voltage levels of two input signals;
    a comparison circuit connected to the second node, for comparing a first current generated by a voltage level of the second node and a reference current and outputting a comparison result; and
    an adjustment circuit generating a current path between the first node and ground on the basis of the comparison result.

12. The differential current driver of claim 11, wherein the first transistor is a p-channel metal-oxide-semiconductor (PMOS) transistor.

13. The differential current driver of claim 12, wherein the first and second switch circuits are PMOS transistors.

14. The differential current driver of claim 12, wherein the adjustment circuit is a PMOS transistor.

15. The differential current driver of claim 11, wherein the comparison circuit comprises:
    a second transistor having a gate electrode connected to the second node;
    a reference current source generating the reference current; and
    a differential amplifier connected to the second transistor and the reference current source and outputting the comparison result.

16. The differential current driver of claim 15, wherein the second transistor is proportional to the first transistor.

17. The differential current driver of claim 11, wherein the controller comprises:
    a first inverter receiving a first signal;
    a second inverter connected to the first inverter;
    a first NAND circuit connected to the second inverter and the first switch circuit and receiving a second signal; and
    a second NAND circuit connected to the first inverter and the second switch circuit and receiving the second signal.

18. The differential current driver of claim 17, wherein the first and second switch circuits are PMOS transistors.

19. The differential current driver of claim 18, wherein the first NAND circuit is connected to a gate electrode of the first switch circuit, and the second NAND circuit is connected to a gate electrode of the second switch circuit.

20. A differential current driver comprising:
a first transistor connected to a first node, the first transistor having a gate electrode connected to a second node;
a first switch circuit connected to the first node and a first output terminal;
a second switch circuit connected to the first node and a second output terminal;
a controller controlling the first and second switch circuits according to voltage levels of two input signals;
a comparison circuit connected to the second node, for comparing a first current generated by a voltage level of the second node and a reference current and outputting a comparison result; said comparison circuit comprising:
a second transistor having a gate electrode connected to the second node, said
second transistor being proportional to the first transistor;
a reference current source generating the reference current; and
a differential amplifier connected to the second transistor and the reference current source and outputting the comparison result; and
an adjustment circuit generating a current path between the first node and ground on the basis of the comparison result;
wherein a drain current of the second transistor is smaller than a drain current of the first transistor.

21. The differential current driver of claim 20, wherein the second transistor is a PMOS transistor.

22. A differential current driver comprising:
a first transistor connected to a first node, the first transistor having a gate electrode connected to a second node;
a first switch circuit connected to the first node and a first output terminal;
a second switch circuit connected to the first node and a second output terminal;
a controller controlling the first and second switch circuits according to voltage levels of two input signals;
a comparison circuit connected to the second node, for comparing a first current generated by a voltage level of the second node and a reference current and outputting a comparison result; said comparison circuit comprising:
a second transistor having a gate electrode connected to the second node;
a reference current source generating the reference current; and
a differential amplifier connected to the second transistor and the reference current source and outputting the comparison result; and
an adjustment circuit generating a current path between the first node and ground on the basis of the comparison result;
wherein the comparison circuit further comprises a current mirror circuit connected to the second transistor and the reference current source.

* * * * *